(12) United States Patent
Terao

(10) Patent No.: US 8,843,485 B2
(45) Date of Patent: Sep. 23, 2014

(54) IMAGE-PROCESSING APPARATUS, IMAGE-PROCESSING METHOD, COMPUTER PROGRAM, AND COMPUTER-READABLE STORAGE MEDIUM

(75) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1269 days.

(21) Appl. No.: 12/169,308

(22) Filed: Jul. 8, 2008

(65) Prior Publication Data

US 2009/0030939 A1 Jan. 29, 2009

(30) Foreign Application Priority Data

Jul. 23, 2007 (JP) ................................. 2007-191014

(51) Int. Cl.
*G06F 17/30* (2006.01)
*G06F 7/00* (2006.01)
*G03G 21/04* (2006.01)
*H04N 1/00* (2006.01)
*H04N 1/44* (2006.01)

(52) U.S. Cl.
CPC ........... *G03G 21/046* (2013.01); *H04N 1/0084* (2013.01); *H04N 1/00875* (2013.01); *H04N 1/4433* (2013.01); *H04N 1/4413* (2013.01)
USPC ............................. 707/736; 707/758; 358/540

(58) Field of Classification Search
USPC ........................... 707/736, 758; 358/540, 3.28
See application file for complete search history.

(56) References Cited

U.S. PATENT DOCUMENTS

| | | | | |
|---|---|---|---|---|
| 4,956,666 A | * | 9/1990 | Allen et al. | 399/366 |
| 5,388,194 A | * | 2/1995 | Vogel | 715/235 |
| 5,452,099 A | * | 9/1995 | Von Meister | 358/403 |
| 5,771,315 A | | 6/1998 | Matsuyama | |
| 5,798,844 A | * | 8/1998 | Sakano et al. | 358/405 |
| 5,832,112 A | * | 11/1998 | Funada et al. | 382/181 |
| 6,014,228 A | * | 1/2000 | Castro | 358/400 |
| 6,658,151 B2 | * | 12/2003 | Lee et al. | 382/229 |
| 7,126,612 B2 | * | 10/2006 | Sekiguchi et al. | 345/589 |

(Continued)

FOREIGN PATENT DOCUMENTS

| | | |
|---|---|---|
| CN | 1885892 | 12/2006 |
| EP | 0 963 099 | 12/1999 |

(Continued)

*Primary Examiner* — Pavan Mamillapalli
(74) *Attorney, Agent, or Firm* — Fitzpatrick, Cella, Harper & Scinto

(57) ABSTRACT

The present invention implements a scan-prohibited function without deteriorating operability. Therefore, the following are performed: a scan-prohibited character string registration; the setting of a rate of object matching; an extraction process operation mode registration in the case where said string is included in print data; a scanning process operation mode registration in the case where said string is included in scanned and obtained data; searching print data for said string; extraction/storing of object data in the print data in accordance with an extraction process operation mode; extraction of object data of scanned image data; comparison of object data between stored print data and scanned image data; comparison of a rate of matching calculated by the comparison with a predetermined one; and if the calculated rate is determined to be higher than the predetermined one, a post-scan process in accordance with the scanning process operation mode.

14 Claims, 19 Drawing Sheets

(56) References Cited

U.S. PATENT DOCUMENTS

| | | | |
|---|---|---|---|
| 7,203,749 B2 * | 4/2007 | Hiraga | 709/224 |
| 7,239,418 B2 * | 7/2007 | Mori | 358/1.18 |
| 7,339,599 B2 | 3/2008 | Hayashi | 345/629 |
| 7,580,159 B2 * | 8/2009 | Guan et al. | 358/3.28 |
| 7,639,836 B2 * | 12/2009 | Ito | 382/100 |
| 7,885,944 B1 * | 2/2011 | Bruening | 707/694 |
| 7,957,034 B2 * | 6/2011 | Ueda et al. | 358/3.28 |
| 2002/0135810 A1 | 9/2002 | Ikenoue et al. | |
| 2003/0093518 A1 * | 5/2003 | Hiraga | 709/224 |
| 2003/0101177 A1 * | 5/2003 | Matsubayashi et al. | 707/6 |
| 2003/0179412 A1 | 9/2003 | Matsunoshita | |
| 2005/0068331 A1 * | 3/2005 | Sekiguchi et al. | 345/589 |
| 2005/0078331 A1 * | 4/2005 | Guan et al. | 358/1.14 |
| 2005/0140679 A1 * | 6/2005 | Kaneda | 345/441 |
| 2006/0290967 A1 | 12/2006 | Sumitomo et al. | |

FOREIGN PATENT DOCUMENTS

| | | |
|---|---|---|
| JP | 7-56483 | 3/1995 |
| JP | 11-355562 A | 12/1999 |
| JP | 2000-123113 | 4/2000 |
| JP | 2004-223854 | 8/2004 |

\* cited by examiner

| DOCUMENT NOS. | OBJECTS | | | | | |
|---|---|---|---|---|---|---|
| 0001 | CHARACTER A | CHARACTER B | CHARACTER C | . . . . | IMAGE A | IMAGE B |
| . . . . | | | | | | |
| N | CHARACTER M | CHARACTER N | IMAGE F | | | |

901 — DOCUMENT NOS.
902 — OBJECTS

FIG.9

| 901 | 902 | 1601 |
|---|---|---|
| DOCUMENT NOS. | OBJECTS | PASSWORD |
| 0001 | CHARACTER A, CHARACTER B, CHARACTER C, IMAGE A, IMAGE B | ********** |
| . | . | . |
| . | . | . |
| N | CHARACTER M, CHARACTER N, IMAGE F | ********** |

FIG.16

IMAGE-PROCESSING APPARATUS, IMAGE-PROCESSING METHOD, COMPUTER PROGRAM, AND COMPUTER-READABLE STORAGE MEDIUM

BACKGROUND OF THE INVENTION

Field of the Invention

The present invention relates to a technique for preventing unauthorized copying and unauthorized transmission of a paper document, on which confidential information is printed, by an image-processing apparatus.

Techniques for preventing unauthorized copying and unauthorized transmission have heretofore been known, as disclosed in Japanese Patent Laid-Open No. 2000-123113 and Japanese Patent Laid-Open No. Hei 07-056483. In these techniques, the copying of a document including a specific character string or a mark, such as "copy prohibited" or "confidential," is prohibited once such specific character string is identified in the document.

Further, as disclosed in Japanese Patent Laid-Open No. 2004-223854, a technique is also known in which a confidential document is printed from a PC with information such as a copy-forgery-inhibited pattern added to the document by settings on a driver side, and thereby watermark information for prohibiting a copy is embedded. In this technology, when printed material having watermark information embedded therein is copied, the embedded information appears, so that unauthorized copying can be prevented.

However, in the above-described technology in which a specific character string is identified to prohibit copying of a document, there is a problem that when a specific character string is filled in (e.g., whited out) so as not to be identified, the document can easily be copied.

Further, in the technology in which watermark information such as a copy-forgery-inhibited pattern is set on a driver side so as to be embedded in printed material, a user needs to perform the setting of a driver. Therefore, the user may forget the setting of the deriver or something similar may occur, so that there is a problem in that user operability is deteriorated.

To solve the above-described problems, the present invention in its first aspect provides an image-processing apparatus comprising: a setting unit to set a rate of object matching on the basis of a user's instruction; a determination unit to determine whether or not print data represents a confidential document; a first object data extraction unit to extract object data in the print data, if the print data is determined to represent a confidential document; an object data storage unit to store the object data extracted by the first object data extraction unit; a second object data extraction unit to extract object data from image data obtained through the scanning of a document; a calculation unit to compare the object data extracted by the second object data extraction unit and the object data stored in the object data storage unit, and thereby to calculate a rate of matching of the object data; a matching rate determination unit to determine whether or not the rate of matching calculated by the calculation unit is higher than the rate of object matching set by the setting unit; and a process restriction unit to restrict a process on the image data, if the calculated rate of matching is determined to be higher than the set rate of object matching.

The present invention in its second aspect provides an image-processing apparatus comprising: setting means for setting a rate of object matching on the basis of a user's instruction; determination means for determining whether or not print data represents a confidential document; first object data extraction means for extracting object data in the print data, if the print data is determined to represent a confidential document; object data storage means for storing the object data extracted by the first object data extraction means; second object data extraction means for extracting object data from image data obtained through the scanning of a document; calculation means for comparing the object data extracted by the second object data extraction means and the object data stored in the object data storage means, and thereby to calculate a rate of matching of the object data; coincidence rate determination means for determining whether or not the rate of matching calculated by the calculation means is higher than the rate of object matching set by the setting means; and process restriction means for restricting a process on the image data, if the calculated rate of matching is determined to be higher than the set rate of object matching.

The present invention in its third aspect provides an image-processing apparatus comprising: a database of object data extracted from documents to be controlled, an object-extraction unit to extract object data from image data obtained by scanning of a document by the image-processing apparatus, a processor for calculating a rate of matching between object data of the scanned document and object data of controlled documents stored in the database, and determining based on the calculated rate of matching whether or not the scanned document is to be treated as a document to be controlled, and a process-restriction unit for restricting processing by the image-processing apparatus of the image data of the scanned document in a case that the processor determines that the scanned document should be treated as a document to be controlled.

When a confidential document is printed, the above configuration makes it possible to extract object data from print data on the side of an image-processing apparatus, and to keep storing the object data. An object extracted and registered at the time of printing, and an object extracted at the time of scanning a document are compared, and the rate of matching thereof is judged, whereby it becomes possible to restrict the processing of a confidential document accordingly.

Further, a character string for determining whether or not a document is a confidential one is registered at user's option. In addition, it is possible to register a plurality of character strings.

When the document is determined to be a confidential one, the following modes can be provided: a mode in which object data is automatically extracted from print data so as to be stored, and a mode in which a user is inquired to determine whether or not to extract and store the object data.

The present invention is particularly suitable for copying and transmission processing of a document.

Further, it is possible to cease processing on image data which shows a high rate of object matching.

Further, it is possible to determine whether or not to restrict the process on image data with a high rate of object matching by user's entering a password. Even for a confidential document, this configuration allows a user who knows a password for unlocking the confidential document to perform scanning.

Further, a mode selection can be made for a process on image data with a high rate of object matching from the two modes: a mode in which the process is automatically ceased and a mode in which the process can be unlocked using a password. Thus, the degree of freedom on setting by a user is increased.

Further, when the rate of matching is calculated, either of all objects or specific objects can be set as comparison targets.

In accordance with the present invention, on a document including scan-prohibited characteristic strings such as "copy prohibited" and "secret," when the document is scanned after these characteristic strings are filled, the scanning can be prohibited.

Still further, when a confidential document is printed from a PC, the confidential document can be registered as a scan-prohibited document only by describing a scan-prohibited character string in the confidential document, without the need of setting a copy-forgery-inhibited pattern and the like on the driver side, so that the user operability is enhanced.

In addition, when a scan-prohibited document is registered, an administrator can set to one of the following modes: a mode in which the document is automatically registered as a scan-prohibited document when a scan-prohibited character string has been in the document, and a mode in which the user can arbitrarily register the document. Therefore, it is possible to provide operability suitable for user's needs.

Further, even for an operation in which a document registered as a scan-prohibited one is scanned, the administrator can set the following modes: a mode in which scanning is automatically prohibited, and a mode in which the inputting of a password allows the user to scan the document. Therefore, it is possible to provide operability suitable for user's needs.

Further, not only whole objects but also a certain type of object in a scanned document can be set as a scan-prohibited target, for example, those limited to image objects can also be set as scan-prohibited target objects. Therefore, for a document containing highly confidential image data, even when the layout of the document has been changed, it is still possible to prohibit the scanning of the document.

Further features of the present invention will become apparent from the following description of exemplary embodiments (with reference to the attached drawings).

BRIEF DESCRIPTION OF THE DRAWINGS

FIG. 9 is a view representing a state at the time when object data is extracted and registered in a storage unit, when an electronic document created by the client PC is printed;

FIG. 16 is a view in which a password is added to FIG. 9 and registered;

DESCRIPTION OF THE EMBODIMENTS

First Embodiment

First, an overall configuration necessary to implement the present invention is described with reference to FIGS. 1 to 3.

Figure 1:
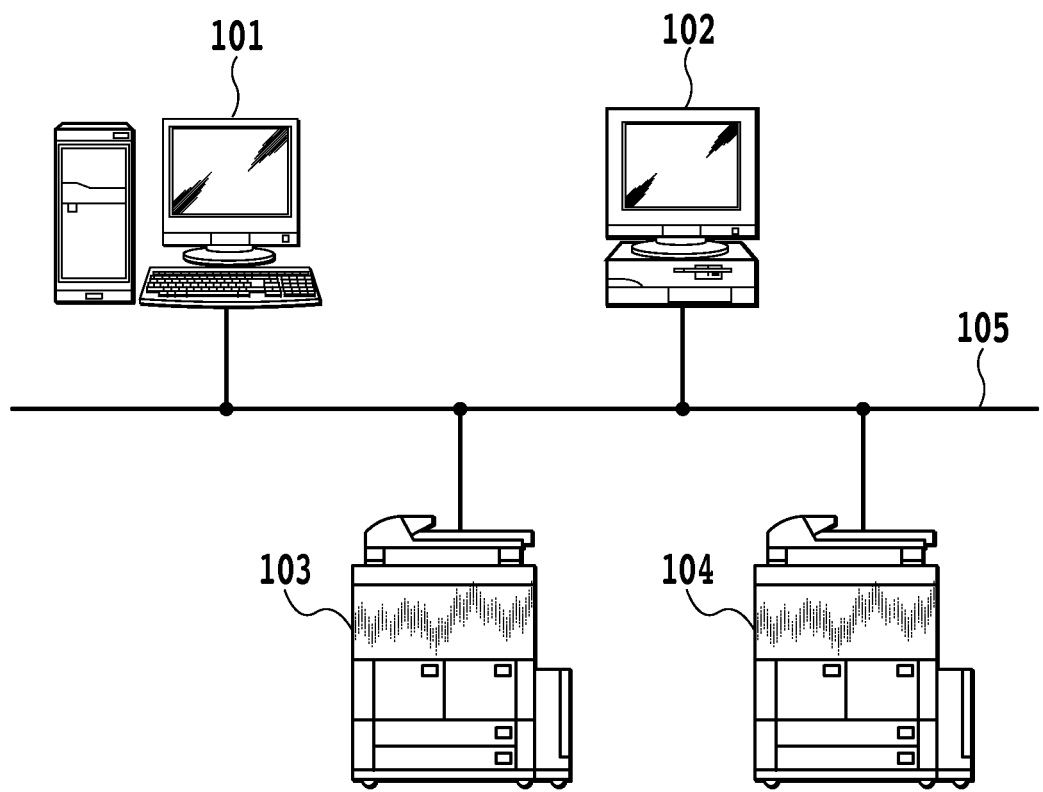
FIG. 1 is a view showing a configuration example of a system of a first embodiment of the present invention.

Here, FIG. 1 represents a configuration of an entire system of a first embodiment of the present invention; FIG. 2 is a block diagram showing a configuration of a sever and a client PC (an external terminal) of FIG. 1; and FIG. 3 is a block diagram showing a configuration of an MFP of FIG. 1.

An MFP 1 (103) and an MFP 2 (104) each include at least a print function and a scanner function. These are each capable of printing an electronic document created by a client PC (102) via a network (105). Further, the MFP 1 (103) and the MFP 2 (104) are capable of searching received print data to find whether or not a specific character string indicating a confidential document is included therein, at the time of printing. When a datum (e.g., a specific character string) indicating a confidential document is included in the print data, it is possible to separate this print data for each object datum and store them in a HDD (306) of each of the MFP 1 (103) and the MFP 2 (104). The data can also be stored in a HDD (205) of an object registration server (101).

Further, the MFP 1 (103) and the MFP 2 (104) have functions which separate a scanned document for each object datum at the time of scanning a paper document. Separated object data is compared with object data stored in the HDD (306) of each of the MFP 1 (103) and the MFP 2 (104), or the HDD (205) of the object registration server (101). From this compared result, a scan operation can be switched in accordance with a set mode, as described later.

Subsequently, configurations of the above-described object registration server (101) and the client PC (102) are described. These devices each include the following devices as typical constituent elements such as those shown in FIG. 2.

201: A central processing unit (CPU) for performing an arithmetic process;

202: A keyboard with which a user performs data input;

203: A display device for performing display on a computer screen;

204: A mouse;

205: A hard disk device (HDD) in which data is stored;

206: A network interface (network I/F unit) for performing communication with a network (105); and 207: A memory in which data is temporarily stored.

Next, configurations of the MFP 1 (103) and the MFP 2 (104) are described. These devices each include the following devices as typical constituent elements such as those shown in FIG. 3.

301: A central processing unit (CPU) for performing an arithmetic process;

302: An operation unit with which a user performs an operation on an MFP;

303: An image-processing unit for performing an operation on an inputted image;

304: A printer unit for outputting print data onto a sheet of paper;

305: A memory in which data is temporarily stored;

306: A hard disk device (HDD) in which data is stored;

307: A network interface (network I/F unit) for performing communication with a network (108);

308: A FAX unit for performing FAX communication; and

309: An input-image-processing unit for scanning paper document.

Figure 4:
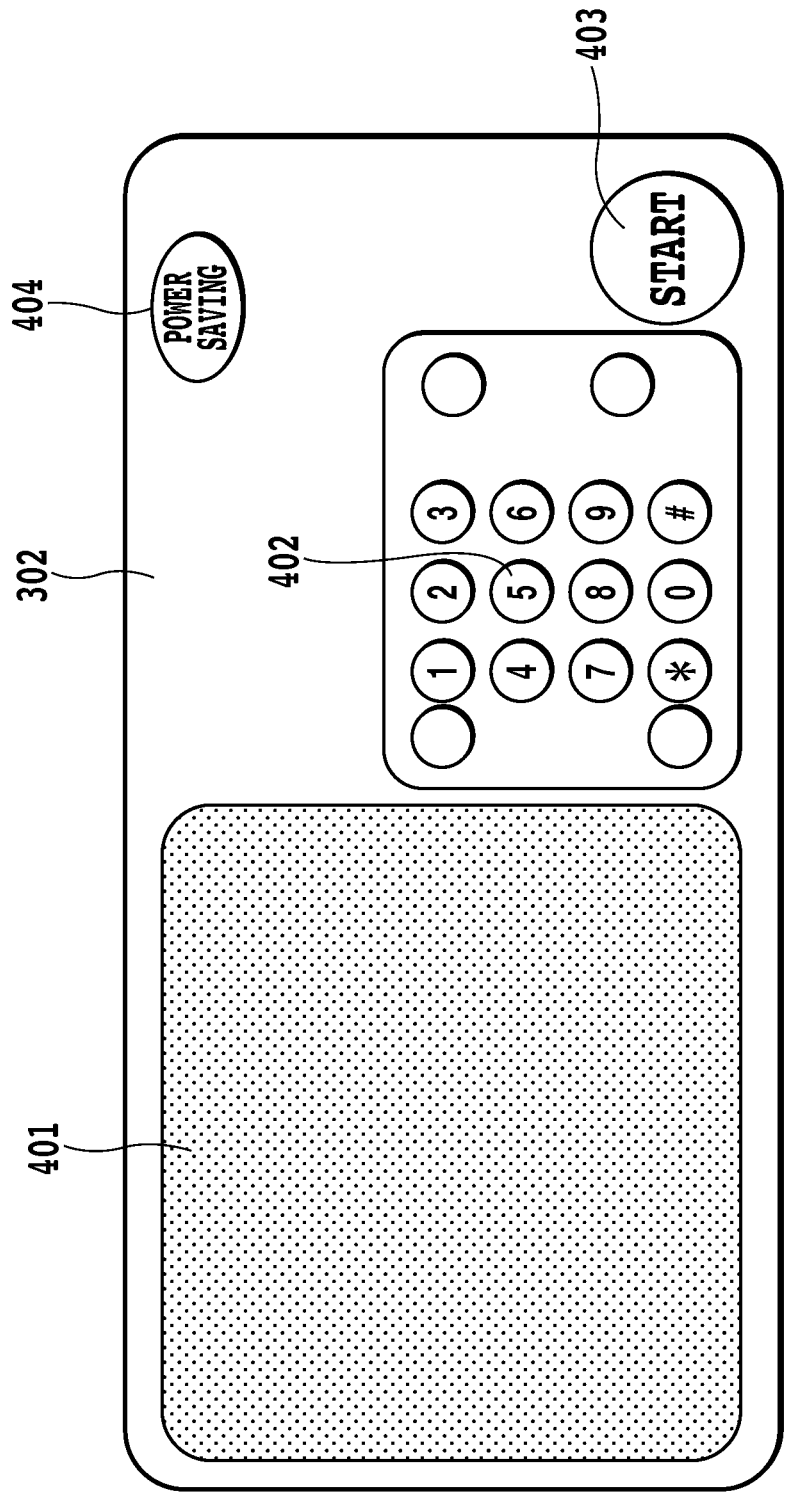
FIG. 4 is an operation unit of the MFP of the first embodiment.

Incidentally, FIG. 4 shows an illustrative example of the operation unit (302), and as shown in the drawing, the operation unit (302) includes various setting keys (numeric keys 402, a start key 403 and a power saving key 404) besides a display screen (401).

Figure 5:
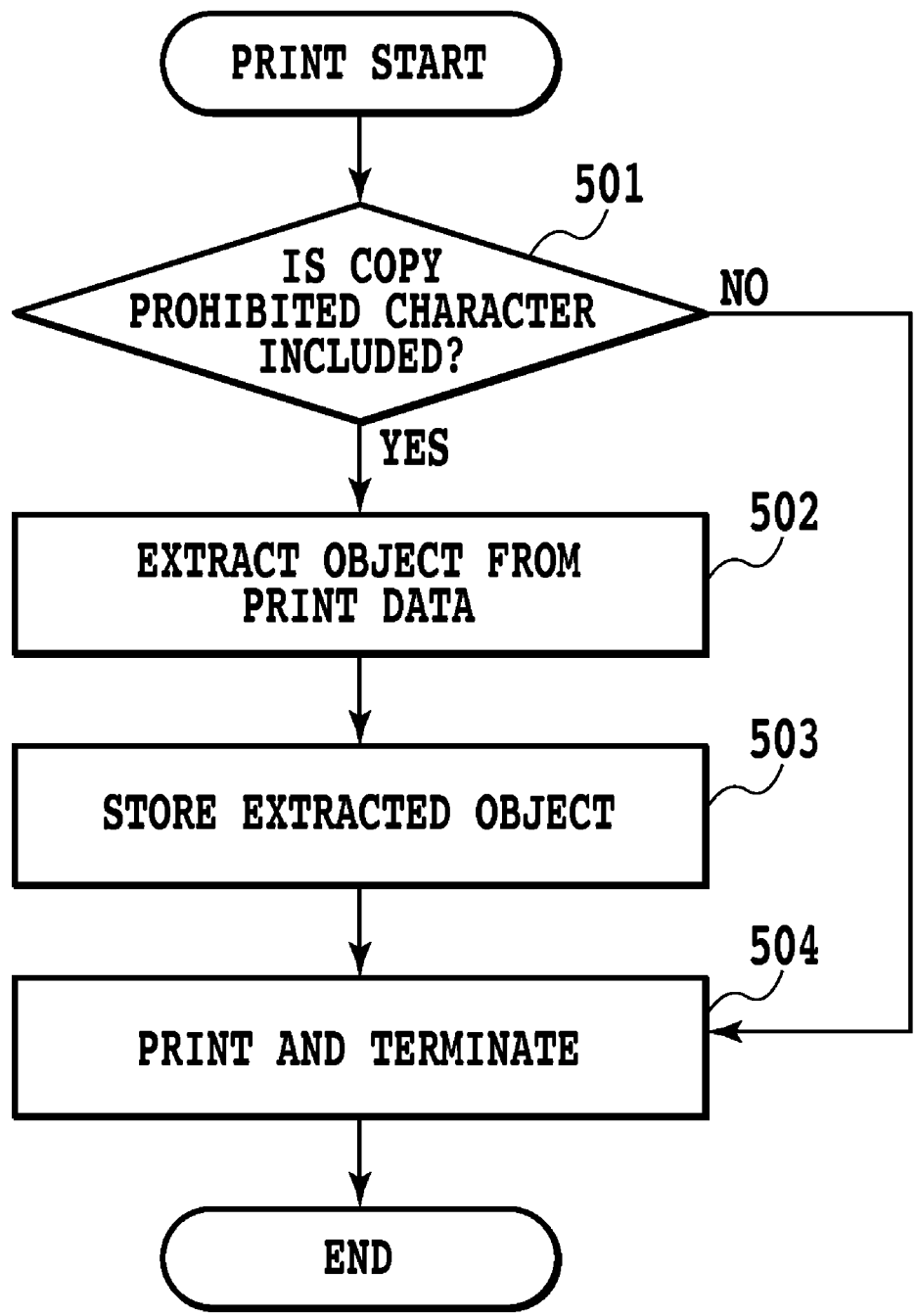
FIG. 5 is a flowchart of the first embodiment.
Figure 6:
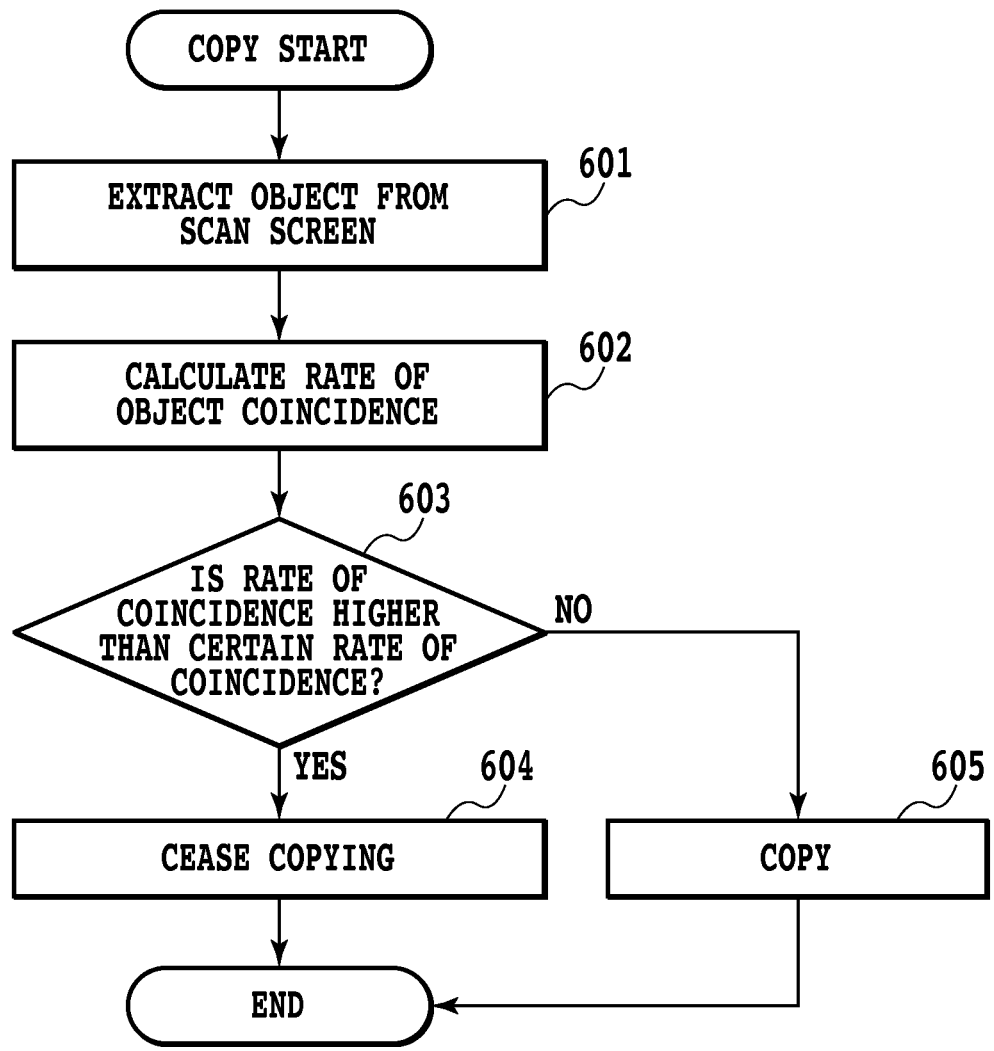
FIG. 6 is another flowchart of the first embodiment.

Next, processes in this embodiment are described in detail in accordance with flowcharts of FIGS. 5 and 6, but before this description a scan-prohibited setting set in the MFP 1 (103) is described with reference to FIG. 7.

Figure 7:
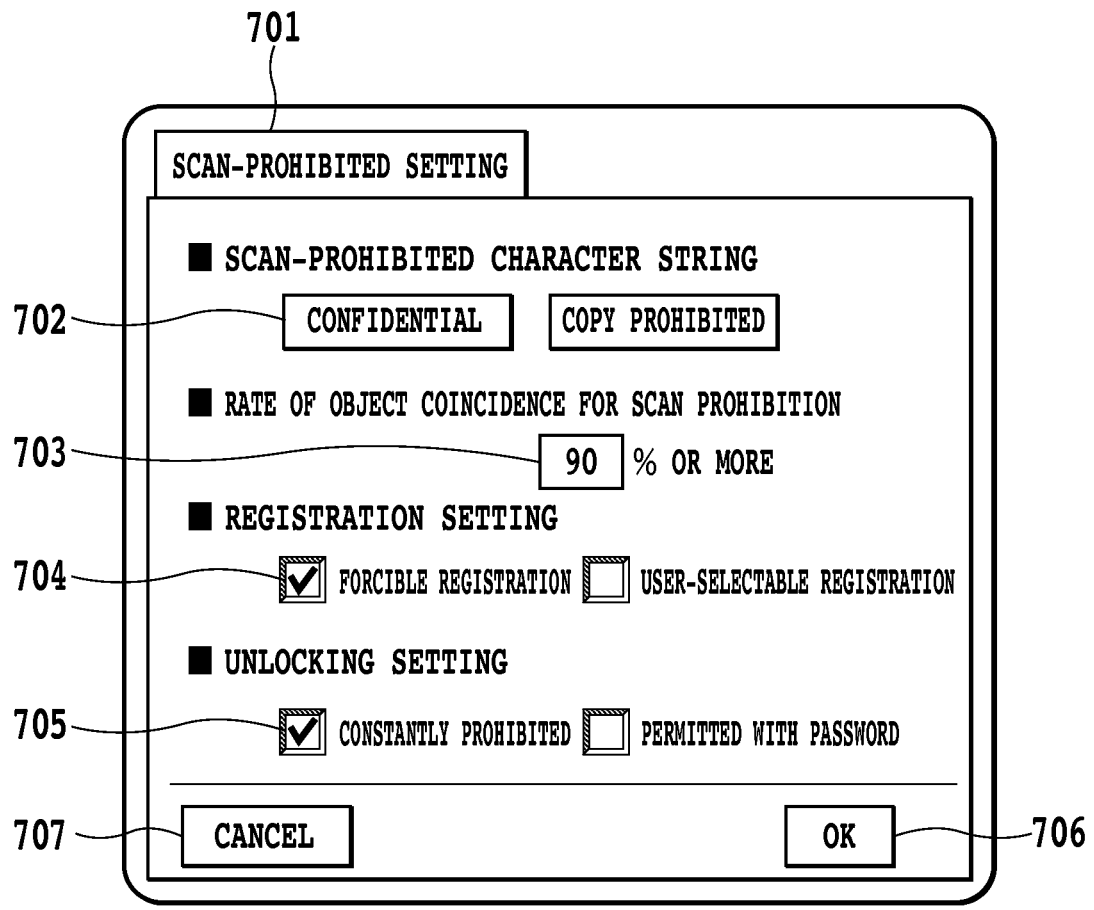
FIG. 7 is a view showing a screen performing a scan-prohibited setting.

In this embodiment, the scan-prohibited setting of the MFP 1 (103) is set using a scan-prohibited setting screen (701) of FIG. 7. In an example of FIG. 7, for the setting of scan-prohibited character strings (702), two character strings, "Confidential" and "Copy-prohibited" are registered. When these character strings are included in print data, the print data is determined to be a confidential document, and from the print data, object data is extracted and stored in the HDD (306).

In FIG. 7, the scan-prohibited character strings (702) are assumed to be the two character strings, "Confidential" and "Copy-prohibited." As a matter of course, a plurality of such character strings can be registered, and character strings to be registered can be changed, added, and deleted through a predetermined user interface (not shown) (character string registration means/step). The rate of object matching (703) for scan-prohibition is a setting on a rate of matching between object data extracted from a scanned document and object data extracted from the above print data stored in the HDD (306). That is, the rate of object matching is a set value specifying to what degree objects are required to match so that scanned data is assumed to be a confidential document. The more this value is increased, the more the documents need to resemble so that the scanned data is assumed to be a confidential document.

For modes (extraction processing operation modes) on a registration setting (704: extraction processing operation registration means), there are "Automatic Registration" and "User-selectable Registration." In the example of FIG. 7, a mode of "Automatic Registration" is set. In the case where the mode of "Automatic Registration" is set, on a document having scan-prohibited character strings included in its print data, object data is automatically extracted and registered. Further, in the case where the mode of "User-selectable Registration" is set, a user is inquired as to whether or not a document is registered as a scan-prohibited document if scan-prohibited character strings are included in its print data. When the user gives an instruction to register the document, object data is extracted from print data, and registered.

For modes (scan processing operation modes) on an unlocking setting (705: scan processing operation registration means), there are "Constantly Prohibited" and "Permitted with Password." In FIG. 7, the mode "Constantly Prohibited" is set. In this mode "Constantly Prohibited," when a scanned document is considered to be a confidential one, an operation after scanning is automatically ceased. Meanwhile, in the case of "Permitted with Password," when a scanned document is considered to be a confidential document, a user is prompted to input a password. Thereafter, when the passwords match, a predetermined operation after scanning is performed. When they do not match, the operation is ceased.

Next, a registration process at the time of printing a document in this embodiment is described in detail.

On the client PC (102), a user is assumed to create an electronic document (801) including a character string (802) of "Confidential" indicating that the document is confidential.

Subsequently, a print instruction of the electronic document (801) is given from the client PC (102) to the MFP 1 (103).

In the MFP 1 (103) which received the print instruction, contents of print data are searched, and it is determined whether or not a scan-prohibited character string is included in the print data (501: a searching step). Here, a determination process as to whether or not a document is confidential is performed based on whether or not the scan-prohibited character string is included.

When it is determined in Step 501 that the scan-prohibited character string is not included, the print data is printed out as it is, and the process is terminated (504). When it is determined in Step 501 that the scan-prohibited character string is included (in this embodiment, the character string, i.e., Confidential, is included), object data is extracted from the print data (502: a first object data extraction step). In an example of FIG. 8, regions of characters A, B, and C, and regions of images A and B are extracted as object data, respectively. In this embodiment, a character region is extracted as object data for a character code; an image region of vector data is extracted as a vector data object; and an image region of raster data is extracted as a raster data object.

A plurality of object data extracted in Step 502 are put together into a set, and the data sets are stored in the HDD (306) (503: an object data storing step).

When the object data is stored in Step 503, a set of extracted object data (902) and document No. (901) are associated with each other and managed in a form shown in FIG. 9. Once the storing of object data is complete in Step 503, print data is printed out and the process is terminated (504).

The above processes describe those from the start of printing to the end thereof.

Figure 8:
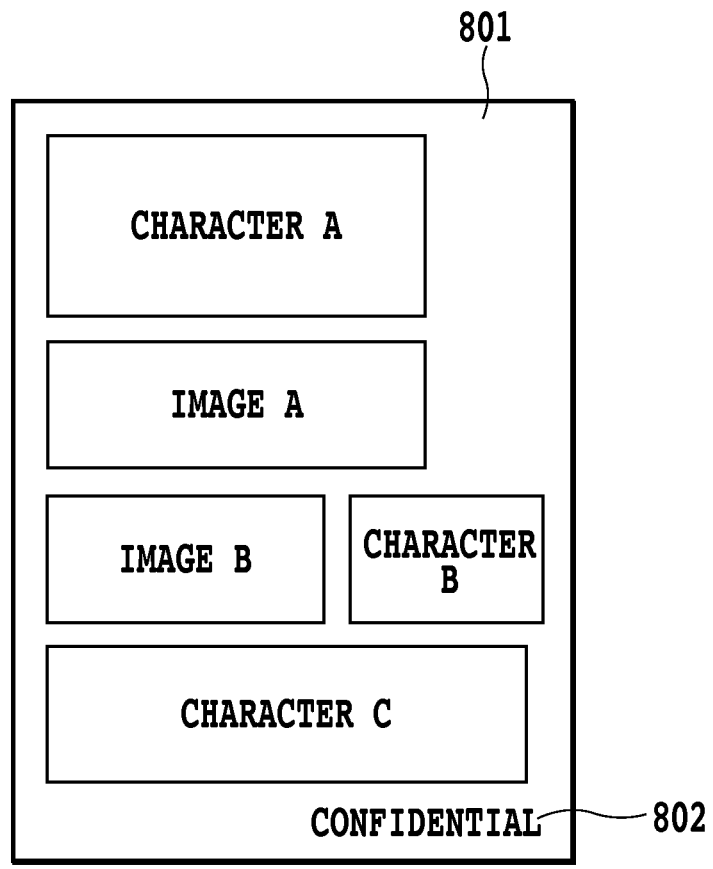
FIG. 8 is a view showing an electronic document created by the client PC.
Figure 13:
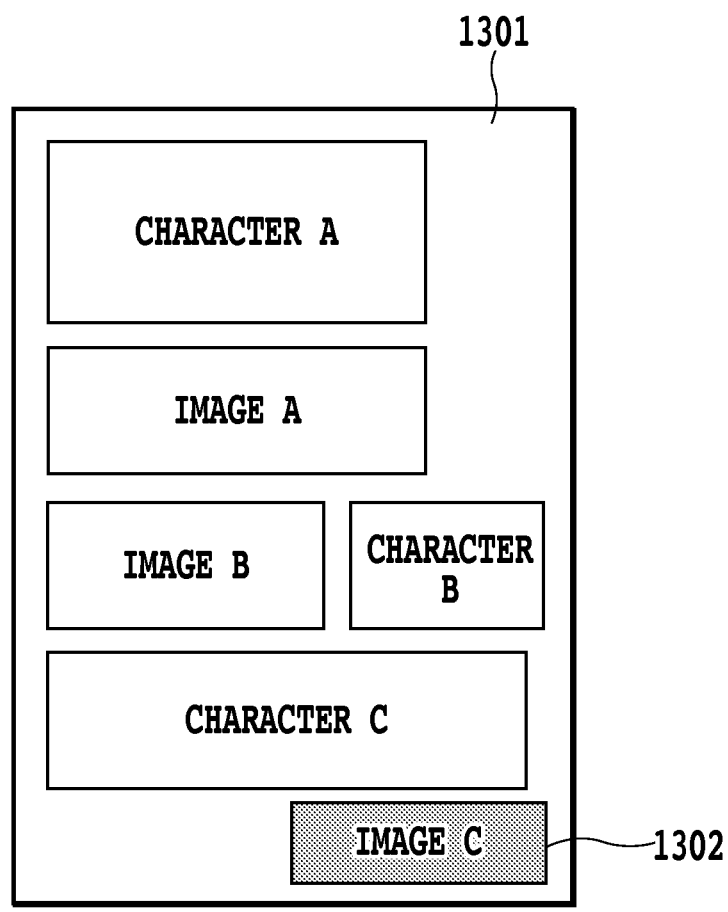
FIG. 13 is a view representing a paper document obtained after a scan-prohibited character string such as Confidential is filled in the paper document of the electronic document of FIG. 8 which has been printed.

Next, shown is a process of copying a paper document on which the electronic document of FIG. 8 is printed. For example, to perform unauthorized copying, it is assumed that a copying instruction is given in a state where a character string being "Confidential" is filled. At this time, a document scanned and obtained by the MFP 1 (103) is obtained as an image, as shown in FIG. 13, in a state where the character string has been filled with an image (1302). A flow of this copying process is described with reference to FIG. 6.

Figure 10:
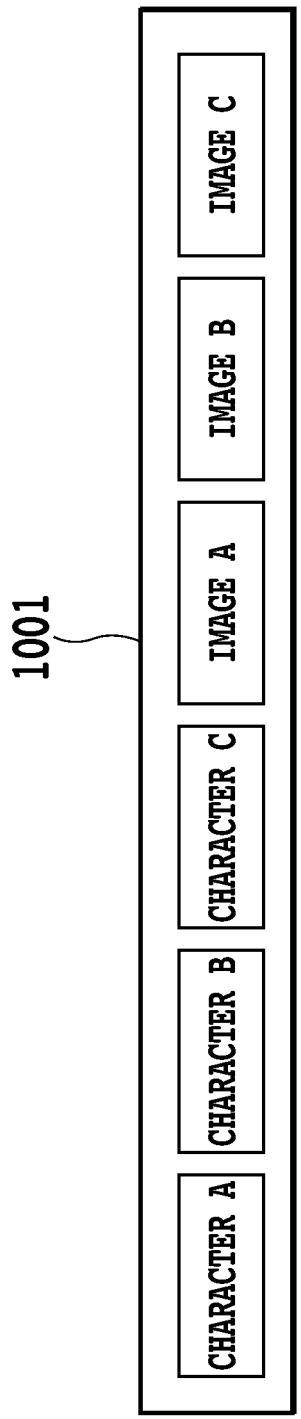
FIG. 10 is a view which a paper document of FIG. 13 is scanned and objects are extracted.

A paper document (1301) is scanned with the MFP 1 (103). Thereafter, when object data is extracted from a scanned image, object data such as those shown in FIG. 10 are extracted (601: a second object data extraction step).

Next, object data extracted in Step 601 and each object datum which have been registered and managed as shown in FIG. 9 are compared, and the rate of matching is calculated (602: a comparison step). When character objects are compared, an OCR process is performed on character regions so that calculation is performed as to whether or not the character objects match. When vector data objects are compared, a vectorization process is performed on an image region, and values of vector data are compared, so that calculation is performed as to whether or not the vector objects match. When raster image objects are compared, calculation as to matching is performed by comparing raster images of an image region in pixel units. Thereafter, based on the number of objects which match with each other and the total number of objects, a calculation is made on the rate of matching between objects extracted from a scanned image and objects of a confidential document which has been registered and managed.

It is determined whether or not the rate of matching calculated in Step 602 is larger than that set in 703 of FIG. 7 (603: a matching rate determination step).

In Step 603, when a determination is made that the rate of matching calculated in Step 602 is lower than that set in 703 of FIG. 7 (i.e., in the case of "No"), the document is considered not to be a confidential one so that the scanned document is copied as it is (605: a scanning process execution step).

In Step 603, when a determination is made that the rate of matching calculated in Step 602 is higher than that set in 703 of FIG. 7 (i.e., in the case of "Yes"), the document is considered to be a confidential one so that the copying process is ceased (604: a scanning process performing step).

The copying processes have been described above, but this embodiment is also applicable to all processes along with scanning (a transmission process of a scanned image and the like). That is, for a document including scan-prohibited character strings such as "Copy Prohibited" and "Confidential," when copying and transmission instructions are given after these character strings are filled, it is possible to prohibit these operations (process restriction). Further, even when a registration instruction and the like are not given on a driver side, at the time of document printing, it is automatically determined whether or not the document is a confidential one based on a character string in the document, and thereafter, registration is made. In addition, for a document determined on the side of an MFP to be a confidential one, the copying of the document is automatically prohibited, so that security is enhanced.

Second Embodiment

Next, a second embodiment to which the present invention has been applied is described.

Figure 2:
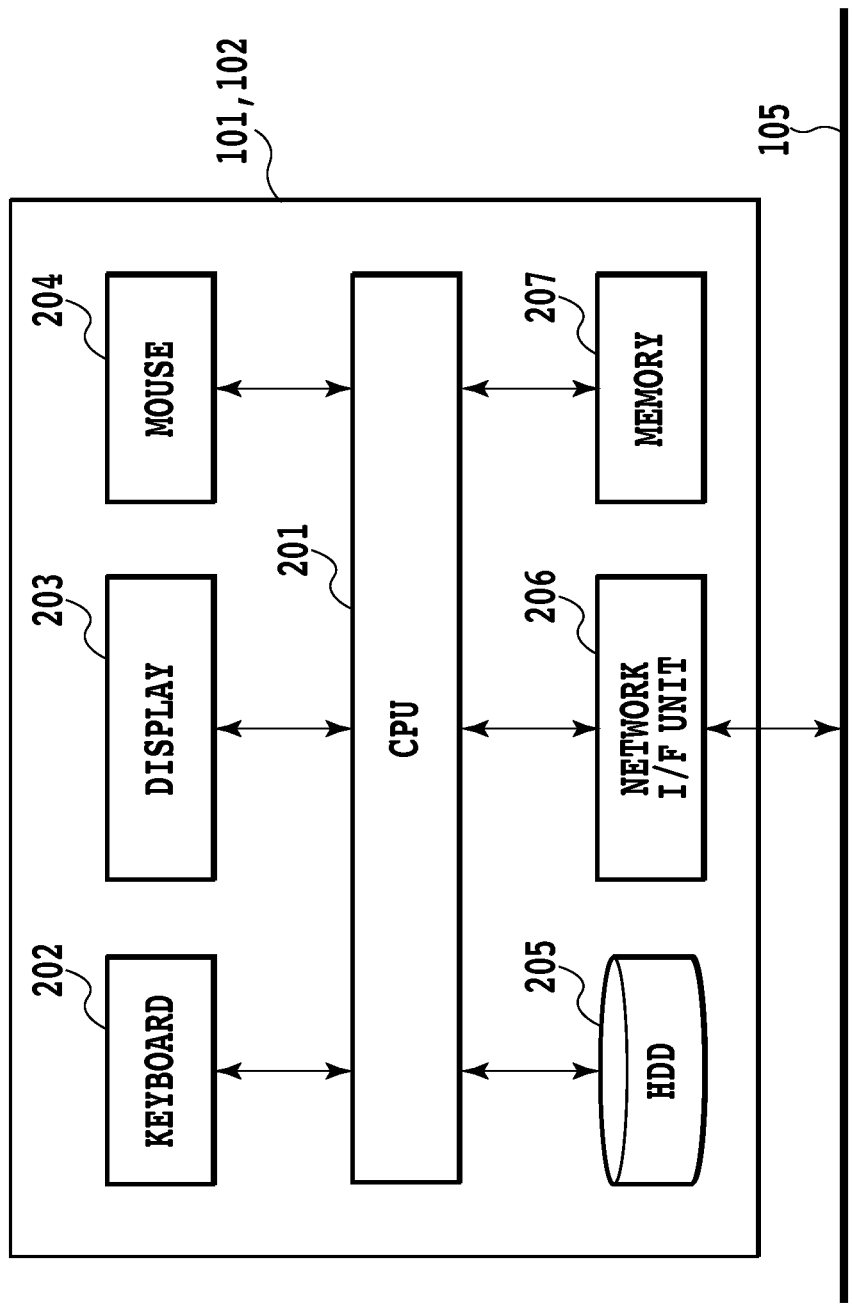
FIG. 2 is a block diagram of a server and a client PC of the first embodiment.
Figure 3:
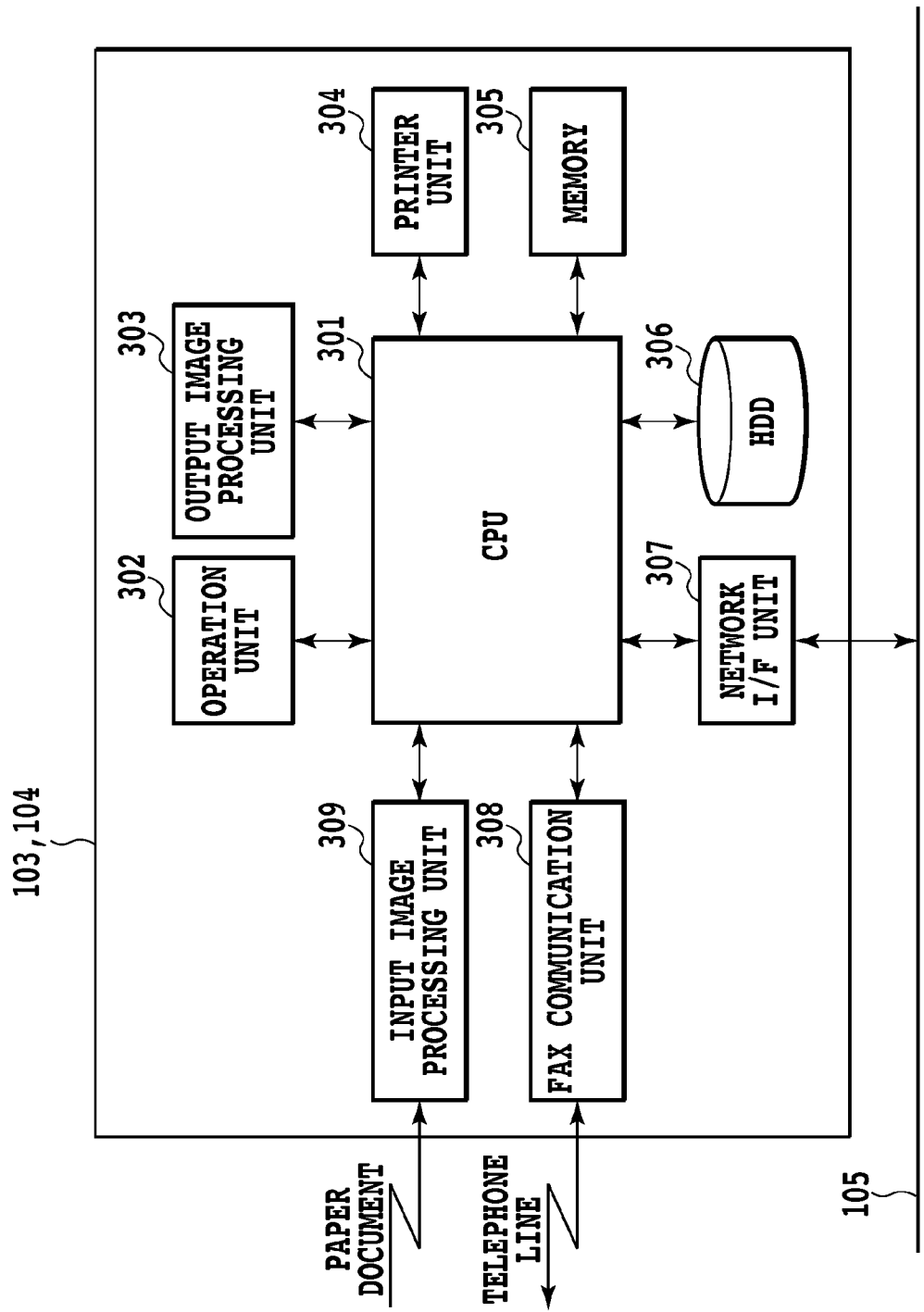
FIG. 3 is a block diagram of an MFP (multifunctional product) of the first embodiment.
Figure 11:
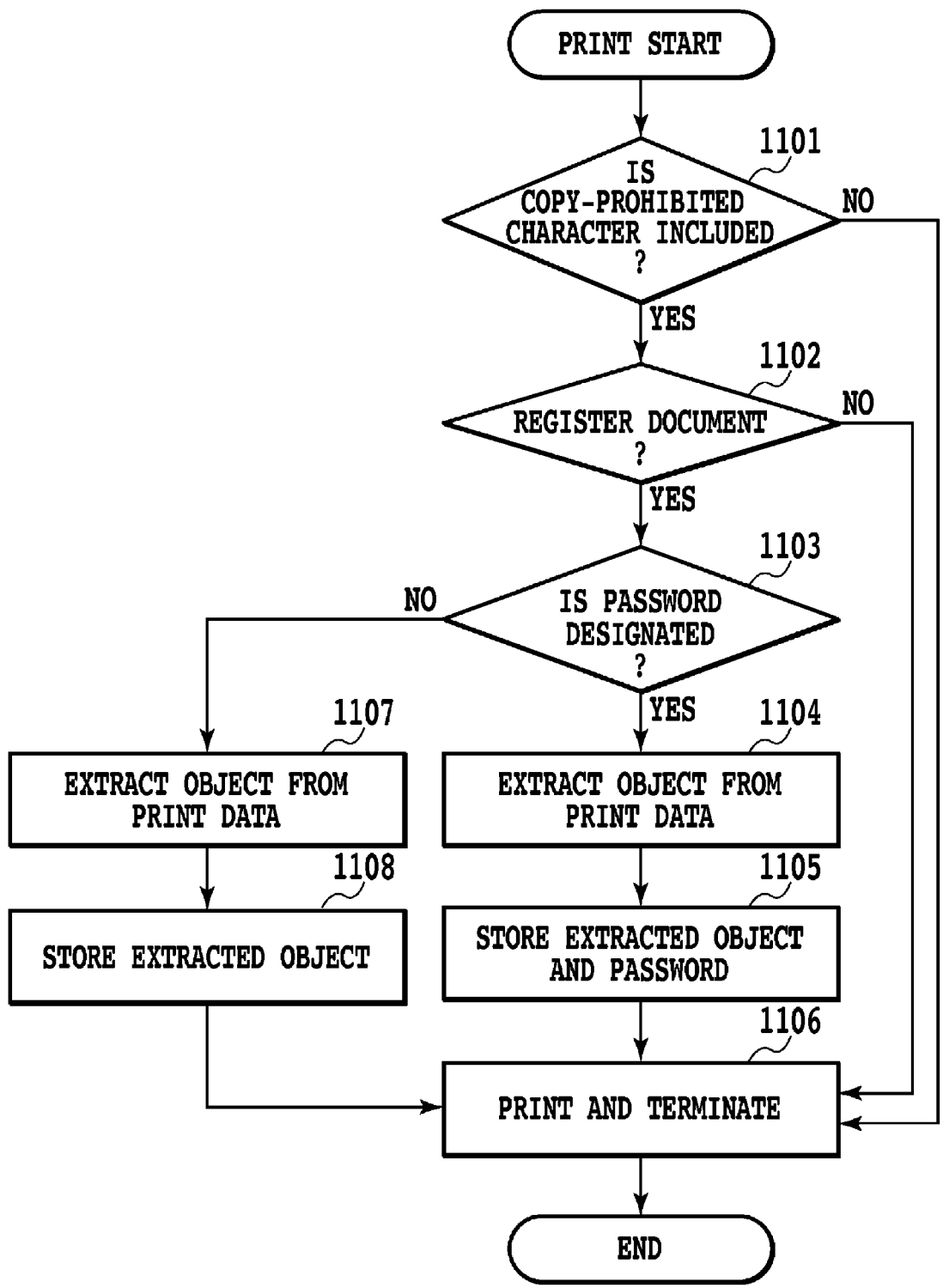
FIG. 11 is a flowchart of a second embodiment of the present invention.
Figure 12:
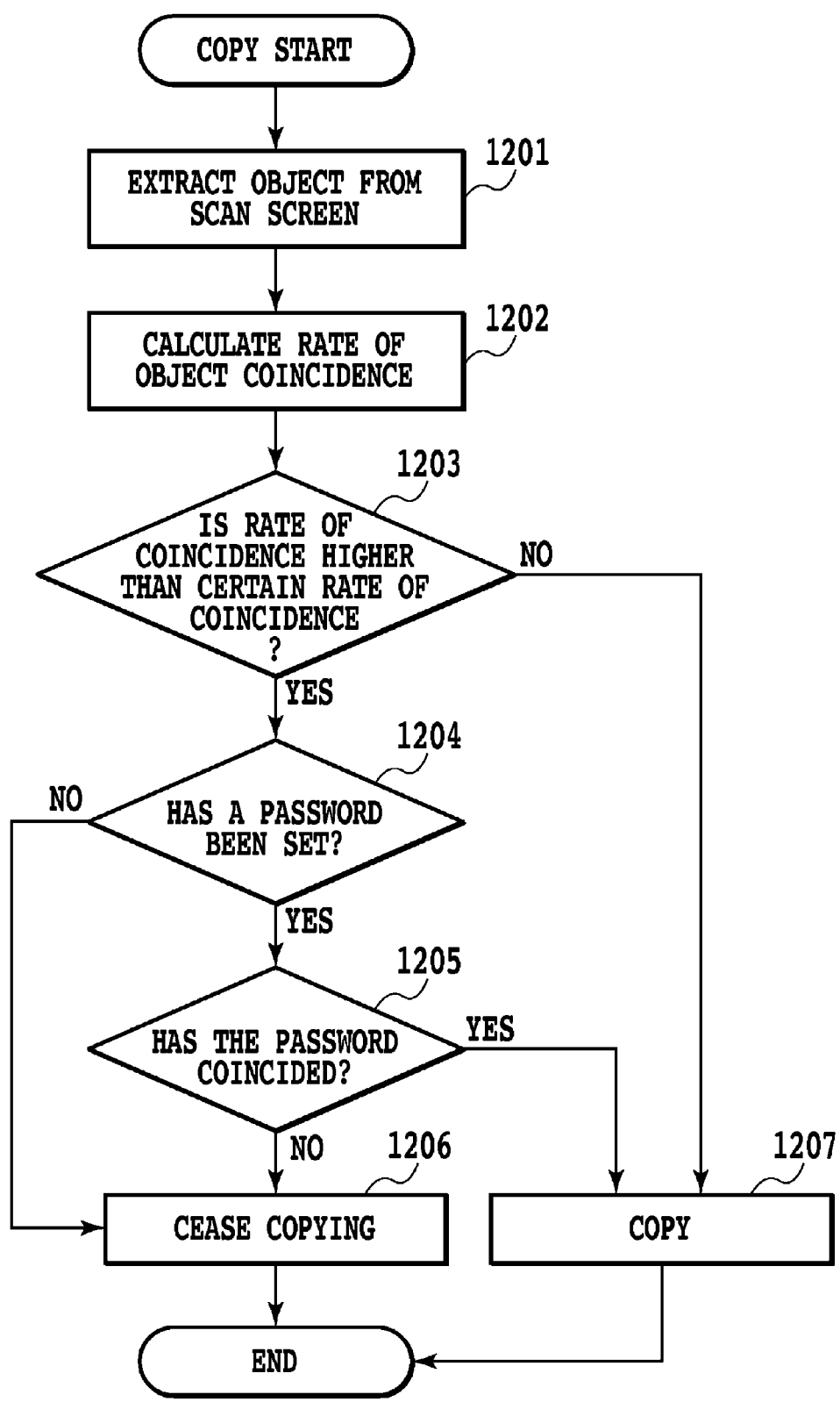
FIG. 12 is another flowchart of the second embodiment of the present invention.

In the following description, contents for FIGS. 1 to 3 are the same as those described in the first embodiment. Therefore, processes of this embodiment are described in detail in accordance with flowcharts of FIGS. 11 and 12.

First, a scan-prohibited setting set in an MFP 1 (103) is described. In this embodiment, the scan-prohibited setting of the MFP 1 (103) is shown in 701 of FIG. 14. In comparison with a scan setting (FIG. 7) of the first embodiment, this embodiment has different settings for a mode of a registration setting (704) and a mode of an unlocking setting (705).

As the mode of the registration setting (704), "User-selectable Registration" is selected. In the case of this mode as described above, concerning a document having a scan-prohibited character string included in its print data, a user is inquired as to whether or not the document is registered as a scan-prohibited document, and is prompted to make a selection as to whether or not the document is registered. That is, the user is allowed to make a selection at the user's option as to whether or not the print data represents a confidential document.

As the mode of the unlocking setting (705), "Permitted with Password" is selected. In this mode, when a scanned document is considered as a confidential one, the user is urged to input a password. When the user inputs a correct password, operations such as copying or transmission are permitted.

First, on the client PC (102), the user is assumed to create an electronic document (801) including a character string (802) of "Confidential" indicating that the document is confidential.

Subsequently, an instruction to print the electronic document (801) is given from the client PC (102) to the MFP 1 (103).

In the MFP 1 (103) upon receipt of the print instruction, it is determined whether or not a scan-prohibited character string is included in the print data (1101).

When it is determined in Step 1101 that the scan-prohibited character string is not included (i.e., in the case of "No"), the print data is printed out as it is, and the process is terminated (1106).

Figure 15:
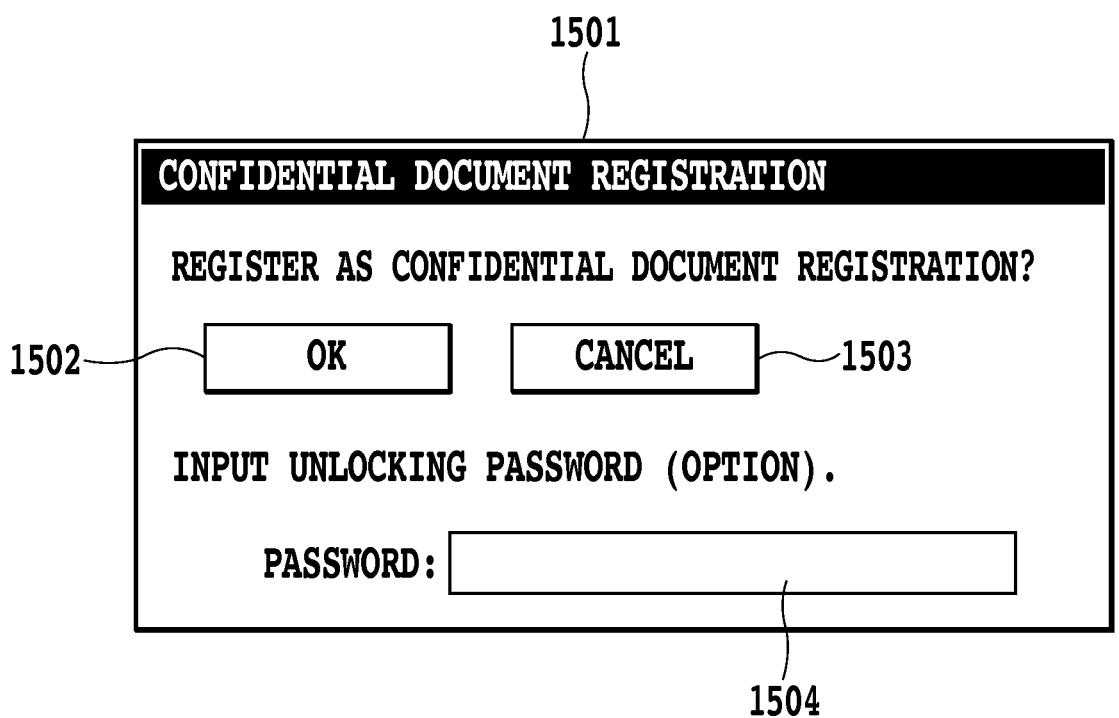
FIG. 15 is a view showing a screen after the user's option has been selected for registration operation as a confidential document for the electronic document created by the client PC.

Meanwhile, it is determined in Step 1101 that the scan-prohibited character string (in this embodiment, "Confidential") is included (i.e., in the case of "Yes"), the following are performed. That is, a dialog message (1501) as shown in FIG. 15 is displayed on a display device of the client PC (102) to prompt the user to select whether or not to register the print data as a confidential document, and then the selection result is determined (1102).

In Step 1102, when a cancel button (1503) is pushed (i.e., in the case of "No"), the print data is not registered as a confidential document, and only a print process is performed (1106).

Meanwhile, in Step 1102, when an OK button (1502) is pushed (i.e., in the case of "Yes"), it is determined whether or not a password has been set for a password input field (1504) for unlocking (1103).

When it is determined in Step 1103 that a password has not been set (i.e., in the case of "No"), the print data is considered to be confidential, and object data is extracted from the print data (1107). Thereafter, the extracted object data is stored in the HDD (306) (1108). When the object data is stored in Step 1108, extracted object data (901) and document No. (902) are associated with each other and managed in a form shown in FIG. 16. It is however noted that a password field is left blank since a password has not been set (1601).

When it is determined in Step 1103 that a password has been set (i.e., in the case of "Yes"), the print data is considered to be confidential, and object data is extracted from the print data (1104). Thereafter, the extracted object data and the password are associated with each other and stored in the HDD (306) (1105). In Step 1105, extracted object data (901), document No. (902), and the password (1601) are associated with each other and managed in a form shown in FIG. 16.

When the storing of object data is complete in Step 1108 or Step 1105, the print data is printed out, and the process is terminated (1106).

Next, shown is a process in copying a paper document as the result of the printing of the electronic document of FIG. 8. For example, to perform unauthorized copying, it is assumed that a copying instruction is given in a state where a character string being "Confidential" is filled. At this time, a document scanned and obtained by the MFP 1 (103) is obtained as an image, as shown in FIG. 13, in a state where the character string has been filled with an image (1302). A flow of this copying process is described with reference to FIG. 12.

A paper document (1301) is scanned using the MFP 1 (103). Thereafter, in extracting object data from a scanned image, object data (1001) such as those shown in FIG. 10 is extracted (1201).

Next, object data extracted in Step 1201 and object data which has been managed in a form shown in FIG. 16 are compared, and the rate of matching is calculated (1202). When character objects are compared, an OCR process is performed on character regions so that calculation is performed as to whether or not the character objects match. When vector data objects are compared, a vectorization process is performed on an image region, and values of vector data are compared, so that calculation is performed as to whether or not the vector objects match. When raster image objects are compared, calculation as to matching is performed by comparing raster images of an image region in pixel units. Thereafter, based on the number of objects which match with each other and the total number of objects, a calculation is made on the rate of matching between objects extracted from a scanned image and objects of a confidential document which has been registered and managed.

Figure 14:
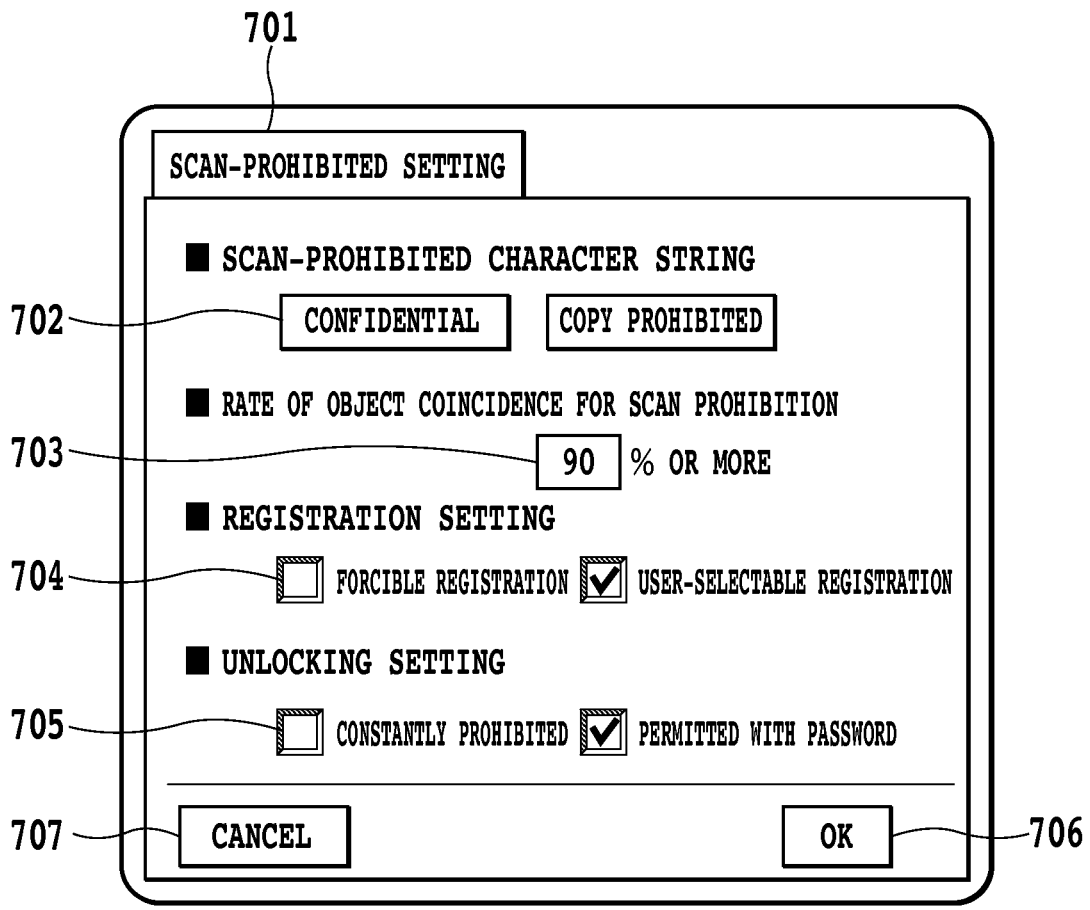
FIG. 14 is a view showing that, on a scan-prohibited setting screen, user's option is selected as a registration mode and permission by a password is selected as an unlocking mode.

It is determined whether or not the rate of matching calculated in Step 1202 is larger than that set in 703 of FIG. 14 (1203).

In Step 1203, when a determination is made that the rate of matching calculated in Step 1202 is lower than that set in 703 of FIG. 14 (i.e., in the case of "No"), the document is considered not to be a confidential one so that the scanned document is copied as it is (1207).

Meanwhile, in Step 1203, when a determination is made that the rate of matching calculated in Step 1202 is higher than that set in 703 of FIG. 14 (i.e., in the case of "Yes"), it is determined whether or not a password (1601) has been set for a set of objects having high rate of matching, by referring to the list as shown in FIG. 16 (1204).

In the determination of Step 1204, when a determination is made that a password has not been set (i.e., in the case of "No"), the scanned document is considered to be a confidential one, and a copying process is ceased (1206).

Figure 17:
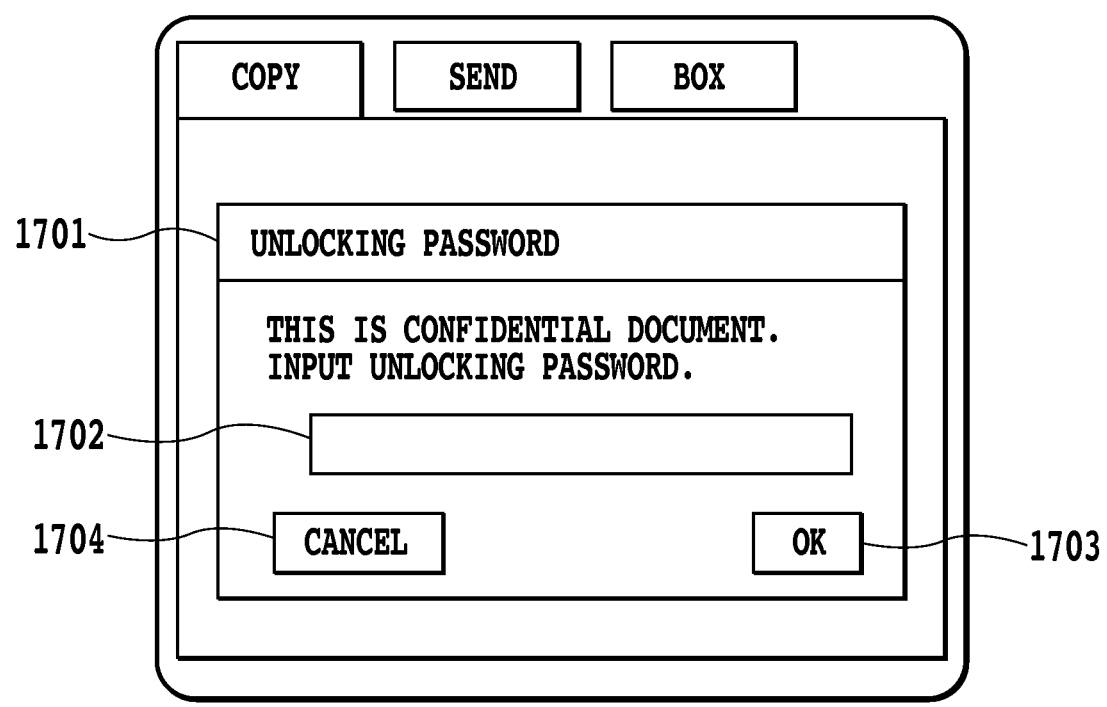
FIG. 17 is a view representing a screen on which unlocking is enabled by the inputting of a password when a confidential document is scanned.

Meanwhile, in the determination of Step 1204, when a determination is made that a password has been set (i.e., in the case of "Yes"), an unlocking password input screen as shown in FIG. 17 is displayed, and the user is prompted to input an unlocking password (1702). Thereafter, it is determined whether or not the inputted password matches with the registered password (1205). When a determination is made that the unlocking password is incorrect, or when a cancel button (1704) is pushed, the copying process is ceased (1206).

When the inputted unlocking password matches with that registered in 1601 of FIG. 16 (i.e., when determined to be "Yes" in Step 1205), a copying process can be performed even for a confidential document (1207).

The copying processes of this embodiment have been described above, but this embodiment is also applicable to all processes along with scanning (a transmission process of a scanned image and the like), as in the first embodiment.

That is, for a document including scan-prohibited character strings such as "Copy Prohibited" and "Confidential," when copying and transmission instructions are given after these character strings are filled, it is possible to prohibit these operations. Further, even when the document is a confidential one, it can be copied by inputting a password, so that it becomes possible to carry out an operation in which only a special user is permitted to perform copying. This enhances the user operability. Incidentally, for an unlocking setting method, one related only to a password has been described, but instead of using a password, it is possible to consider an unlocking method in which a particular user is designated so that this designated user is allowed to unlock a scan prohibition.

Third Embodiment

Next, a third embodiment to which the present invention has been applied is described.

In this embodiment, points different from those of the first and second embodiments are only described.

Figure 18:
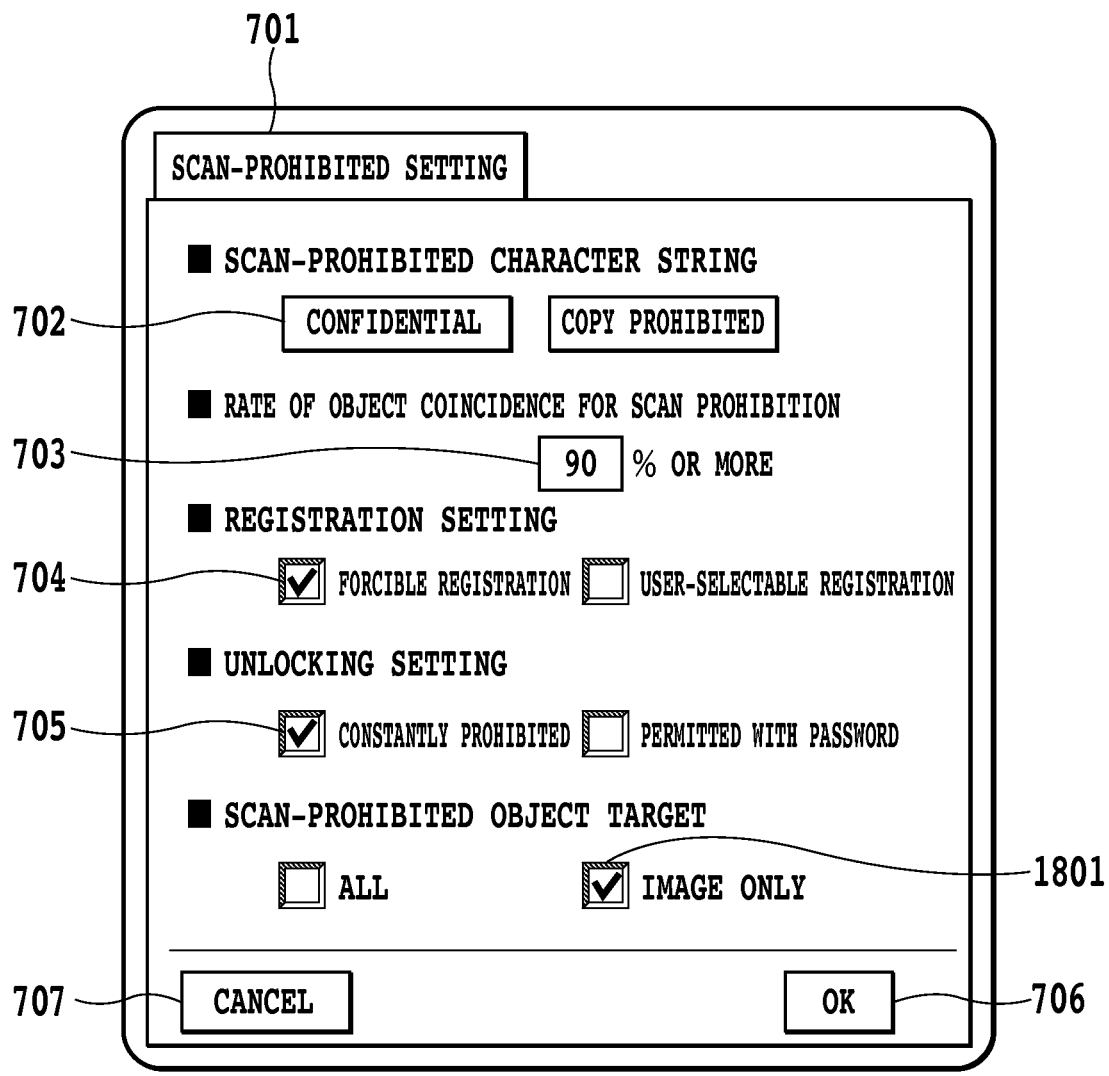
FIG. 18 is a view in which a scan-prohibited target object is set to only images on a scan-prohibited setting screen.

Points different from those of the first and second embodiments reside in the fact that items (1801) of a scan-prohibited target object are added in the scan-prohibited setting screen (701) shown in FIG. 18. In the first and second embodiments, all object data have been considered as comparison targets, but setting to "only an image" can limit object data comparison targets to an image object.

Figure 19:
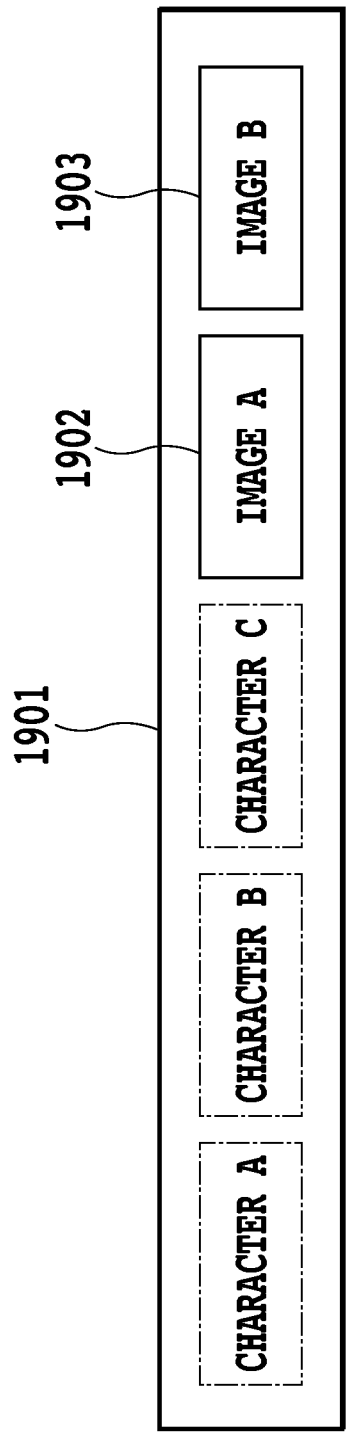
FIG. 19 is a view for describing operation on a comparison of object data in the case where a scan-prohibited target object is set to only images.

For example, object data shown in FIG. 19 are assumed to be extracted as a result of extracting object data from scanned data (1901). In the first and second embodiments, all the extracted object data (1901) and all the object data stored in the HDD (306) have been compared. However, setting to "only an image" limits comparison targets to only image object data (1902, 1903), and other character objects and the like can be excluded from the comparison targets.

Thus, in a department where a document having an image considered as an important portion is handled as a confidential document (for example, product design), it is possible to restrict copying and transmission on the basis of the rate of matching of image objects.

Incidentally, in this embodiment, as a comparison target, "only an image" is added as an option, but "only a character" may be added as an option.

The object of the present invention can also be accomplished in such a way that, from a storage medium storing a program code which achieves a procedure of the flowchart shown in the above embodiments, a computer (or CPU or MPU) of the system or apparatus reads and executes the program code. In this case, functions of the above embodiments are implemented using the program code read from the storage medium. Therefore, the program code and the computer readable storage medium, in which the program code is recorded or stored, constitute part of the present invention.

As storage media to provide the program code, for example, the following can be used: a floppy (a registered trademark) disk, a hard disk, an optical disk, a magneto optical disk, a CD-ROM, a CD-R, a magnetic tape, a nonvolatile memory card, a ROM, and the like.

Further, means to implement the functions of the above embodiments are not limited only to execution of the program code read by the computer. The implementation of the functions of the above embodiments also includes the following case: based on instructions of the program code, an OS (operating system) or the like operating on the computer performs part or all of actual processes, and by these processes, the functions of the above embodiments are implemented.

Still further, a function enhancement board inserted in a computer, a CPU included in a function enhancement unit connected to the computer, or the like performs part or all of actual processes, and also by these processes, the functions of the above embodiments are implemented. In this case, the program code read from the storage medium is written in a memory included in the function enhancement board or the function enhancement unit, and thereafter, processes are executed by the CPU or the like on the basis of instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-191014, filed Jul. 23, 2007, which is hereby incorporated by reference herein in its entirety.

What is claimed is:

1. An image-processing apparatus comprising:
 a setting unit to set a rate of object matching on the basis of a user's instruction using a setting screen;
 a determination unit to determine whether or not print data represents a confidential document;
 a first object data extraction unit to extract object data from the print data if the print data is determined by the determination unit to represent a confidential document;
 an object data storage unit to store the object data extracted from the print data by said first object data extraction unit;
 a second object data extraction unit to extract object data from a scanned image that is obtained by scanning a document, the extracted object data extracted from the scanned image including a character region and an image region;
 a calculation unit to determine whether the object data extracted from the scanned image by said second object data extraction unit matches the object data stored in said object data storage unit, and to calculate a matching rate based on the number of object data determined to match each other and the total number of object data extracted by said second object data extraction unit;
 a matching rate determination unit to determine whether or not the matching rate calculated by said calculation unit is higher than the rate of object matching set by said setting unit; and
 a process restriction unit to restrict a process on the scanned image, if the matching rate is determined by said matching rate determination unit to be higher than the rate of object matching.

2. The image-processing apparatus according to claim 1, wherein
 said setting unit further sets a character string on the basis of a user's instruction, and
 said determination unit further determines whether or not the print data represents a confidential document on the basis of whether or not the character string set by said setting unit is included in the print data.

3. The image-processing apparatus according to claim 2, wherein based on the user's instruction, said setting unit sets one or a plurality of character strings.

4. The image-processing apparatus according to claim 1, wherein said setting unit sets, based on the user's instruction, one of the following modes to be used when said determination unit determines that the print data represents a confidential document: a mode in which object data is automatically extracted from the print data and stored; and a mode in which a user is queried as to whether or not to extract and store object data from the print data, and in accordance with the user's choice, a determination is made whether or not to extract and store the object data.

5. The image-processing apparatus according to claim 1, wherein a process restricted by said process restriction unit is any one of a copying process and a transmission process.

6. The image-processing apparatus according to claim 1, wherein if the matching rate is determined to be higher than the rate of object matching, said process restriction unit halts a process being performed on the image data.

7. The image-processing apparatus according to claim 1, wherein if the matching rate is determined to be higher than the rate of object matching, said process restriction unit prompts the user to input a password; and
 wherein, if the inputted password matches a password registered in advance, said process restriction unit allows a process to be performed on the image data; and if the inputted password does not match the password registered in advance, said process restriction unit halts a process being performed on the image data.

8. The image-processing apparatus according to claim 1, wherein said setting unit further sets, based on the user's instruction, one of the following modes: a mode in which a process on the image data is automatically halted by said process restriction unit; and a mode in which whether a process to be performed on the image data is allowed or halted by said process restriction unit is determined depending on a password inputted by the user.

9. The image-processing apparatus according to claim 1, wherein in the comparison by said calculation unit, either all objects or only specific objects are compared based on a setting.

10. The image-processing apparatus according to claim 9, wherein said setting unit is operable to set, based on a user's instruction, whether during calculation by said calculation unit all the objects or only the specific objects are compared.

11. The image-processing apparatus according to claim 1, wherein, if the print data is determined to represent the confidential document, said first object data extraction unit extracts a first character code as the object data of a character region from the print data, and extracts first vector data as the object data for an image region of vector data from the print data, and extracts a first raster data object as the object data for an image region of raster data from the print data,
 and wherein said object data storage unit stores the first character code, the first vector data and the first raster data object extracted by said first object data extraction unit,
 and wherein said calculation unit compares a second character code obtained by performing an OCR process on the object data of the character region extracted from the scanned image by said second object data extraction unit with the first character code stored in said object data storage unit, and compares second vector data obtained by performing a vectorization process on the object data of the image region extracted from the scanned image by said second object data extraction unit with the first vector data stored in said object data storage unit, and compares a second raster image object of the image region extracted from the scanned image by said second object data extraction unit with the first raster image object stored in said object data storage unit in pixel units, and determines, based on the comparison results, whether the object data extracted from the scanned image by said second object data extraction unit matches the object data stored in said object data storage unit, and calculates the matching rate based on the number of object data determined to match each other and the total number of object data extracted by said second object data extraction unit.

12. An image-processing method comprising:
 setting a rate of object matching based on a user's instruction using a setting screen;

determining whether or not print data represents a confidential document;

extracting object data from the print data if the print data is determined to represent a confidential document;

storing the object data extracted from the print data;

extracting object data from a scanned image that is obtained by scanning of a document, the extracted object data extracted from the scanned image including a character region and an image region;

determining whether the object data extracted from the scanned image matches the stored object data, and calculating a matching rate based on the number of object data determined to match each other and the total number of object data extracted in the step of extracting object data from the scanned image;

determining whether or not the matching rate is higher than the rate of object matching; and restricting a process on the scanned image, if the matching rate is determined to be higher than the rate of object matching.

13. A computer program stored in a non-transitory computer readable storage medium, the computer program causing a computer to:

set a rate of object matching on the basis of a user's instruction using a setting screen;

determine whether or not print data represents a confidential document;

extract object data from the print data, if the print data is determined to represent a confidential document;

store the object data extracted from the print data;

extract object data from a scanned image that is obtained by scanning a document, the extracted object data extracted from the scanned image including a character region and an image region;

determine whether the object data extracted from the scanned image matches the stored object data, and calculate a matching rate based on the number of object data determined to match each other and the total number of object data extracted from the scanned image;

determine whether or not the matching rate is higher than the rate of object matching; and restrict a process to be performed on the scanned image, if the matching rate is determined to be higher than the rate of object matching.

14. A non-transitory computer readable storage medium storing a computer program for causing a computer to:

set a rate of object matching on the basis of a user's instruction using a setting screen;

determine whether or not print data represents a confidential document;

extract object data from the print data, if the print data is determined to represent a confidential document;

store the object data extracted from the print data;

extract object data from a scanned image that is obtained by scanning a document, the extracted object data extracted from the scanned image including a character region and an image region;

determine whether the object data extracted from the scanned image matches the stored object data, and calculate a matching rate based on the number of object data determined to match each other and the total number of object data extracted from the scanned image;

determine whether or not the matching rate is higher than the rate of object matching; and restrict a process to be performed on the scanned image, if the matching rate is determined to be higher than the rate of object matching.

* * * * *